United States Patent [19]

Perkins et al.

[11] 4,402,226

[45] Sep. 6, 1983

[54] ICE STRESS GAUGE

[75] Inventors: Thomas K. Perkins, Dallas; Edward J. McBride, Irving, both of Tex.

[73] Assignee: Atlantic Richfield Company, Los Angeles, Calif.

[21] Appl. No.: 215,219

[22] Filed: Dec. 11, 1980

[51] Int. Cl.³ .......................... G01L 19/04; G01L 7/06
[52] U.S. Cl. ........................................ 73/708; 73/729
[58] Field of Search ................. 73/784, 756, 708, 706, 73/729, 731; 128/748

[56] References Cited

U.S. PATENT DOCUMENTS

| | | | |
|---|---|---|---|
| 1,898,848 | 2/1933 | O'Brien | 128/748 |
| 2,284,707 | 6/1942 | Wilson | 73/784 |
| 2,336,500 | 12/1943 | Osterberg | 73/784 |
| 3,286,514 | 11/1966 | Anderson | 73/784 |
| 3,529,468 | 9/1970 | Carlson | 73/784 |
| 3,772,911 | 11/1973 | Vladimirovich | 73/784 |

Primary Examiner—Donald O. Woodiel
Attorney, Agent, or Firm—Albert C. Metrailer

[57] ABSTRACT

A stress gauge comprising a pair of substantially circular metal sheets welded together along their circumference, a metal tube in communication with the space between metal sheets, a pressure transducer attached to the metal tube and a slightly pressurized fluid filling the tubing and the space between the metal sheets. Liquid pressure is selected to provide a desired volume between the two plates, thereby providing a proper aspect ratio and preferably reducing the sensitivity of the gauge to temperature changes. When positioned in a solid ice sheet, pressure output indications from the pressure transducer are directly correlated to stress in the ice normal to the plane of the metal sheets.

18 Claims, 2 Drawing Figures

ICE STRESS GAUGE

BACKGROUND OF THE INVENTION

This invention relates generally to stress sensors and more particularly to a rugged, but accurate, sensor for detecting stress in ice.

It is well known that commercial hydrocarbon deposits have been found in arctic-type areas where hazardous environmental conditions are common. In areas such as the north slope of Alaska, large accumulations of ice can cause numerous problems. Particularly in offshore work, the large ice layers move and can easily destroy even heavy drilling platforms and other equipment. It is clear that it would be desirable to known the levels of stress developing in masses of ice surrounding equipment such as drilling rigs. Thus, if a record of ice build-up were available, precautionary measures could be taken before the stress levels exceeded the design levels of the particular structure.

It is apparent that an ice stress sensor could be appropriately buried within a possibly dangerous ice mass. However, it is also apparent that the burial process and physical characteristics of the sensor itself could affect the detected readings and cause false indications of true stress levels. It is also apparent that the sensor will be subject to tremendous stress levels and to rough treatment in installation. It is, therefore, quite desirable that the stress sensor by very rugged as well as accurate.

SUMMARY OF THE INVENTION

Accordingly, an object of the present invention is to provide an improved ice stress sensor.

Another object of the present invention is to provide a simple, yet rugged, ice stress sensor.

Yet another object of the present invention is to provide an ice stress sensor which accurately indicates actual ice stress.

An ice stress sensor according to the present invention comprises a pair of metal sheets bonded together along their circumferences to form an enclosed fluid-tight space, a small conduit having one end in communication with the fluid-tight space, a pressure transducer in communication with the other end of the conduit, and a pressurized liquid filling the conduit and the space between the circular sheets. Stress from a surrounding medium applied to the plate surfaces generates an essentially linearly related increase in fluid pressure which is detected by the pressure transducer which, therefore, provides an output proportional to detected stress.

BRIEF DESCRIPTION OF THE DRAWINGS

The present invention may be better understood by reading the following detailed description of the preferred embodiment with reference to the accompanying drawings wherein.

DESCRIPTION OF THE PREFERRED EMBODIMENTS

Figure 1:
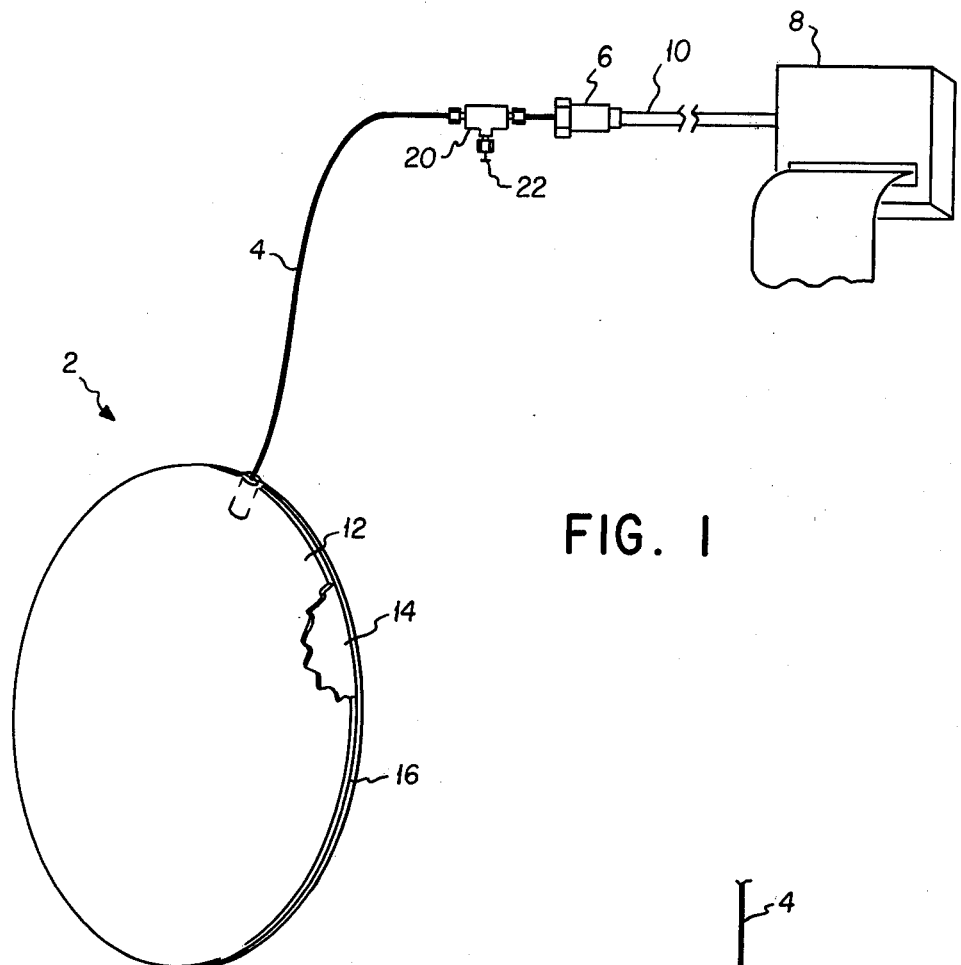
FIG. 1 is a perspective view of an ice stress sensor according to the present invention connected to a read-out device; and, FIG. 2 is a cross-sectional view of the detector portion of the ice stress sensor according to the present invention.
Figure 2:
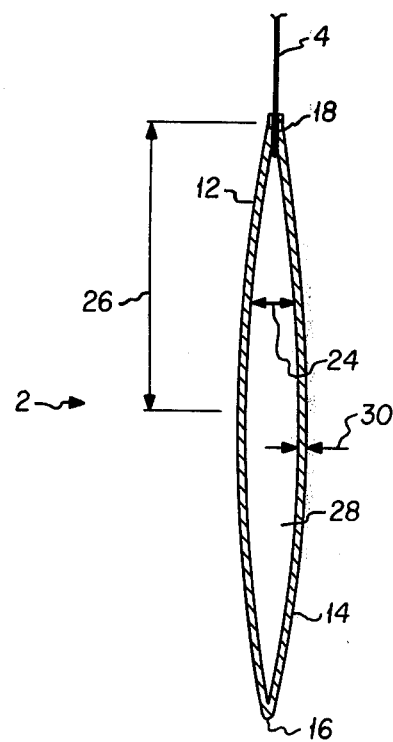

FIGS. 1 and 2 illustrate the details of an ice stress sensor according to the present invention. This sensor comprises a detector portion indicated generally at 2, a conduit 4 and a pressure transducer 6. Also illustrated in FIG. 1 is a read-out device 8 connected by electrical wires 10 to the output of pressure transducer 6.

The detector portion 2, as shown in both FIGS. 1 and 2, is preferably formed from two simple circular sheets of metal 12 and 14. In a preferred embodiment of the present invention, the sheets 12 and 14 were cut from 16 gauge (0.062 inch thick) 300 series stainless steel and had a diameter of about eight inches. The sheets 12 and 14 are bonded together along their circumferences 16 in a mechanically strong and fluid-tight manner. In the preferred embodiment, the sheets 12 and 14 were clamped together while a continuous weld was formed along the circumferences 16 using a heliarc process. A perfectly circular shape of sheets 12 and 14 allows the welding to be performed in a smooth continuous manner thereby providing a high quality weld. As shown in the cross-sectional view of FIG. 2, the weld provides a semicircular bead joining the edges of sheets 12 and 14. A one-sixteenth inch diameter hole 18 was then drilled through this weld with the axis of the hole centered between sheets 12 and 14 as illustrated in FIG. 2. The conduit 4 is the preferred embodiment was one-sixteenth inch outer diameter stainless steel tubing. The tubing 4 was inserted in hole 18 and brazed into the hole to provide communication with the space between plates 12 and 14. The other end of conduit 4 was connected using standard fittings to a fluid input of pressure transducer 6.

In the preferred embodiment, pressure transducer 6 was a commercially available bonded strain gauge pressure transducer. Such transducers have very low internal volume and detect pressure changes with essentially no internal movement. This type of pressure transducer is particularly suited for use in the present invention. The transducer used in the present invention was obtained from Paine Instruments, Inc., 2401 South Bayview Street, Seattle, Washington, 98144 and was of that company's series 210-75 type. Other similar transducers could, of course, be substituted.

From the above description, it is apparent that there is initially very little space between sheets 12 and 14. The sheets 12 and 14 are initially in contact with each other over their adjacent surfaces. Sandblasting or otherwise slightly roughening these adjacent surfaces is believed to be desirable to aid in evacuating and refilling the space between sheets. A fluid filled space 28 is provided within detector 2 by using pressurized fluid to inflate the detector. The inflated form of the detector is illustrated in exaggerated form in FIG. 2. It can be appreciated that all space within the stress sensor should be filled with a low compressibility material such as a liquid and no gases should be allowed to remain. A T-fitting and valve 20 is preferably provided on conduit 4. This fitting 20 provides an outlet 22 by which the entire internal volume of the device may be evacuated by all gas and then refilled with an appropriate liquid. It has been found that an appropriate transducer average fluid thickness indicated at 24 may be achieved by filling detector 2 with a liquid at a pressure of less than ten and usually only about three pounds per square inch. The desired thickness 24 is determined based upon two factors which are explained in more detail below. In this preferred embodiment, the liquid used to fill the device was a mixture of 60% ethylene glycol and 40% water on a volume basis.

A first factor in determining an appropriate average thickness 24 for the fluid-filled volume is the aspect ratio of the detector portion 2. The aspect ratio as used herein is the average thickness 24 divided by the radius of detector portion 2 indicated at 26 in FIG. 2. We have determined that for a very small aspect ratio the pressure change within fluid 28 is essentially directly proportional to external stresses applied normal to sheets 12 and 14. Our calculations and tests indicate that an aspect ratio of approximately 0.01 provides an error of less than five percent in the correspondence between measured fluid pressure and actual applied stress. Smaller aspect ratios would, or course, further decrease the error. The average thickness 24 of the liquid 28 should, in this preferred embodiment, be 0.04 inches to provide this desirable aspect ratio.

A second factor to be considered in improving performance of the stress sensor is the thermal coefficient of expansion of the detector 2 as compared to that of the surrounding ice. It can be seen that the thickness 30 of the plates 12 and 14 is substantially greater than the preferred thickness 24 of the measuring liquid itself. The thermal coefficient of expansion of the metal is, therefore, significant in determining the overall coefficient of expansion of detector 2. For the dimensions of the preferred embodiment device, the metal occupies a volume of 6.23 cubic inches. By comparing the coefficient of expansion of ice, stainless steel and the sixty percent ethylene glycol and water mixture, we have found that a volume of 1.1 cubic inches of liquid combined with the 6.23 cubic inches of stainless steel provides a coefficient of thermal expansion which matches that of ice at $-20°$ C. This same ratio of volumes would provide the same thermal coefficient of expansion match for other sizes of detectors. That is, the liquid volume should be approximately 0.177 times the metal volume. This ratio will, of course, change if other metals or liquids are used. In the preferred embodiment, this ratio of volumes is quite convenient in that it also provides an aspect ratio of approximately 0.01. In addition, in the preferred embodiment the appropriate quantity of liquid may be injected into detector 2 to appropriately inflate it at a pressure of less than five pounds per square inch.

As noted above, the completed ice stress sensor of the present invention should be evacuated and filled with an appropriate fluid under pressure. This is preferably performed at the point of assembly and should not require checking in the field. A vacuum pump and fluid source are connected by appropriate fittings and valves to outlet 22. The valve 20 is opened and the pump operated to evacuate all gases from the system. By checking the vacuum level and ability to hold vacuum, leaks may be detected. After proper evacuation, the system is filled with fluid to inflate sensor 2. A simple syringe may conveniently be used as a source of fluid. Manual actuation of the syringe provides the necessary pressure to inflate detector 2. Volume calibrations on the syringe provide a simple indication of injected fluid volume. Once the preselected fluid volume has been injected, the sensor is ready for use.

In initial developments of the stress sensor of the present invention, it was believed that very thin metal sheets 12 and 14 should be used. Initial experiments employed 0.005 inch thick brass sheets. However, this material proved to be difficult to handle in the welding of the edges and to have other problems. In particular, the material was too flexible making the device fairly fragile and also creating the possibility of having point contacts between the metal sheets 12 and 14 at locations other than the circumferences. Such point contacts would absorb disproportionately high percentages of applied stress preventing correct readings of the external stress. It was believed at the time that the fairly thin material was needed to eliminate effects of metal internal stress and to allow appropriate inflation at reasonable pressures. However, as is illustrated by the preferred embodiment, fairly thick stiff sheets of strong stainless steel material can be easily inflated to appropriate and even optimum thicknesses at relatively low pressures below five pounds per square inch. The internal stresses in the stainless steel plate resulting from the very slight inflation are so small that they can be ignored. The stiffness of the plates, however, makes the device quite rugged and prevents undesired warping and the internal point contacts which could result therefrom. In addition, we have found, as noted above, that the use of much thicker steel sheets allows the matching of the overall device thermal coefficient of expansion to that of the surrounding ice. Such a match could not have been achieved with the very thin material initially used.

The ice stress sensor of the invention is used as follows. A cavity, such as a narrow slot, is cut in ice at the desired location and with the proper orientation. After the ice stress sensor has been evacuated and filled with pressurized fluid as described above, the detector 2 is lowered into the cavity by means of the conduit 4. The detector may be suspended by place while the cavity is filled with water and allowed to refreeze. The transducer 6 is preferably located above the ice surface or in a protected compartment several feet from the detector 2. The electrical wires 10 connect the transducer 2 to a read-out device which may be located at some distance if desired. For example, the read-out device 8 might be located within a control room of a drilling or production structure. As illustrated, the read-out device 8 may be a strip chart recorder which provides a permanent record of detected stress versus time. If desired, an analog or digital meter read-out device may be connected to the output 10 to provide an instantaneous reading to the operator. In similar fashion, the readings may be conducted to a general purpose computer which can periodically sample the readings and issue appropriate warnings when stress levels exceed safe levels. In any case, read-out device 8 includes a source of DC potential for supplying excitation to the transducer 6. It is anticipated that in most cases, three stress detectors of the present invention would be implanted in a rossette configuration at each location where measurements are to be taken. Such an arrangement would allow the determination of the actual direction of stress developed in the ice being monitored.

While the detector 2 of the present invention is formed from circular sheets 12 and 14, it is apparent that other shapes could be used. For example, detector 2 could be square or have some other straight sided shape. The circular shape is preferred primarily because of ease of assembly, but may have operational advantages too.

While the present invention has been illustrated and described in terms of particular apparatus and methods of use, it is apparent that various modifications and changes can be made within the scope of the present invention as defined by the appended claims.

What is claimed is:

1. An ice stress gauge comprising:

two substantially identically shaped metal sheets joined together along their outer edges to form a fluid-tight enclosed volume between said sheets;

a conduit having one end bonded to at least one of said sheets in communication with said enclosed volume;

a pressure transducer having a fluid input coupled to a second end of said conduit, and an output for providing an indication of pressure at said input; and a liquid filling said enclosed volume, said conduit, and said pressure transducer input;

wherein the volume occupied by the metal forming said metal sheets is larger than the volume occupied by the liquid filling said enclosed volume.

2. An ice stress gauge comprising:

two substantially identically shaped metal sheets joined together along their outer edges to form a fluid-tight enclosed volume between said sheets;

a conduit having one end bonded to at least one of said sheets in communication with said enclosed volume;

a pressure transducer having a fluid input coupled to a second end of said conduit, and an output for providing an indication of pressure at said input; and a liquid filling said enclosed volume, said conduit, and said pressure transducer input;

wherein said enclosed volume is selected as a function of the volume occupied by said sheets and the thermal expansion coefficients of said sheets and said liquid to provide an effective thermal expansion coefficient for the gauge essentially equal to the expansion coefficient of ice.

3. An ice stress gauge comprising:

two substantially circular metal sheets joined together along their circumferences to form a fluid-tight enclosed volume between said sheets, each of said sheets formed from steel plates and having a ratio of thickness to diameter greater than 0.005;

a conduit having one end bonded to at least one of said sheets and in communication with said enclosed volume;

a pressure transducer having a fluid input coupled to a second end of said conduit, and an output for providing an indication of pressure of said input; and a liquid filling said enclosed volume, said conduit, and said pressure transducer input, said liquid having a low positive pressure relative to external pressure and separating said plates to form said enclosed volume;

said enclosed volume selected as a function of the volume occupied by said sheets and the thermal expansion coefficients of said sheets and said liquid to provide an effective thermal expansion coefficient for the gauge essentially equal to the expansion coefficient of ice.

4. An ice stress gauge comprising:

two substantially identically shaped metal sheets joined together along their outer edges to form a fluid-tight enclosed volume between said sheets, said enclosed volume being less than the volume occupied by said metal sheets;

a conduit having one end bonded to at least one of said sheets in communication with said enclosed volume;

a pressure transducer having a fluid input coupled to a second end of said conduit, and an output for providing an indication of pressure at said input; and a liquid filling said enclosed volume, said conduit, and said pressure transducer input;

wherein said enclosed volume is selected as a function of the volume occupied by said sheets and the thermal expansion coefficients of said sheets and said liquid to provide an effective thermal expansion coefficient for the gauge essentially equal to the expansion coefficient of ice.

5. An ice stress gauge comprising:

two substantially identically shaped metal sheets joined together along their outer edges to form a fluid-tight enclosed volume between said sheets, said enclosed volume being less than the volume occupied by said metal sheets;

a conduit having one end bonded to at least one of said sheets in communication with said enclosed volume;

a pressure transducer having a fluid input coupled to a second end of said conduit, and an output for providing an indication of pressure at said input; and a liquid filling said enclosed volume, said conduit, and said pressure transducer input;

wherein the ratio of the thickness of each of said sheets to the largest dimension of said sheets is greater than 0.005.

6. An ice stress gauge comprising:

two substantially identically shaped metal sheets joined together along their outer edges to form a fluid-tight enclosed volume between said sheets, said enclosed volume being less than the volume occupied by said metal sheets;

a conduit having one end bonded to at least one of said sheets in communication with said enclosed volume;

a pressure transducer having a fluid input coupled to a second end of said conduit, and an output for providing an indication of pressure at said input; and a liquid filling said enclosed volume, said conduit, and said pressure transducer input;

wherein each of said sheets is formed from steel plate and the ratio of the thickness to the largest dimension of said sheets is greater than 0.005.

7. The gauge of claim 6 wherein said steel plate is stainless steel.

8. The gauge of claim 6 wherein said liquid is under a low initial pressure, relative to external pressure, and said pressurized liquid separates said sheets to form said enclosed volume.

9. The gauge of claim 8 wherein said low initial pressure is less than ten pounds per square inch.

10. An ice stress gauge comprising:

two substantially identically shaped metal sheets joined together along their outer edges to form a fluid-tight enclosed volume between said sheets, each of said sheets having a thickness at least 0.005 times the largest dimension of said sheets;

a conduit having one end bonded to at least one of said sheets in communication with said enclosed volume;

a pressure transducer having a fluid input coupled to a second end of said conduit, and an output for providing an indication of pressure at said input; and a liquid filling said enclosed volume, said conduit, and said pressure transducer input.

11. The gauge of claim 10 wherein said liquid is under a low pressure, relative to external pressure, and said pressurized liquid separates said sheets to form said enclosed volume.

12. The gauge of claim 11 wherein said low initial pressure is less than ten pounds per square inch.

13. The gauge of claim 10 wherein the ratio of the average thickness of said enclosed volume to the radius of said volume is about 0.01.

14. The gauge of claim 10 wherein each of said sheets is formed from steel plate.

15. The gauge of claim 14 wherein said steel plate is stainless steel.

16. The gauge of claim 14 wherein said liquid is under a low initial pressure, relative to external pressure, and said pressurized liquid separates said sheets to form said enclosed volume.

17. The gauge of claim 16 wherein said low initial pressure is less than ten pounds per square inch.

18. The gauge of claim 10 wherein said enclosed volume is selected as a function of the volume occupied by said sheets and the thermal expansion coefficients of said sheets and said liquid to provide an effective thermal expansion coefficient for the gauge essentially equal to the expansion coefficient of ice.

* * * * *